April 17, 1956 R. J. SUTTON 2,742,236
CONTROL SYSTEM FOR WASTE DISPOSAL APPARATUS
Filed April 29, 1953
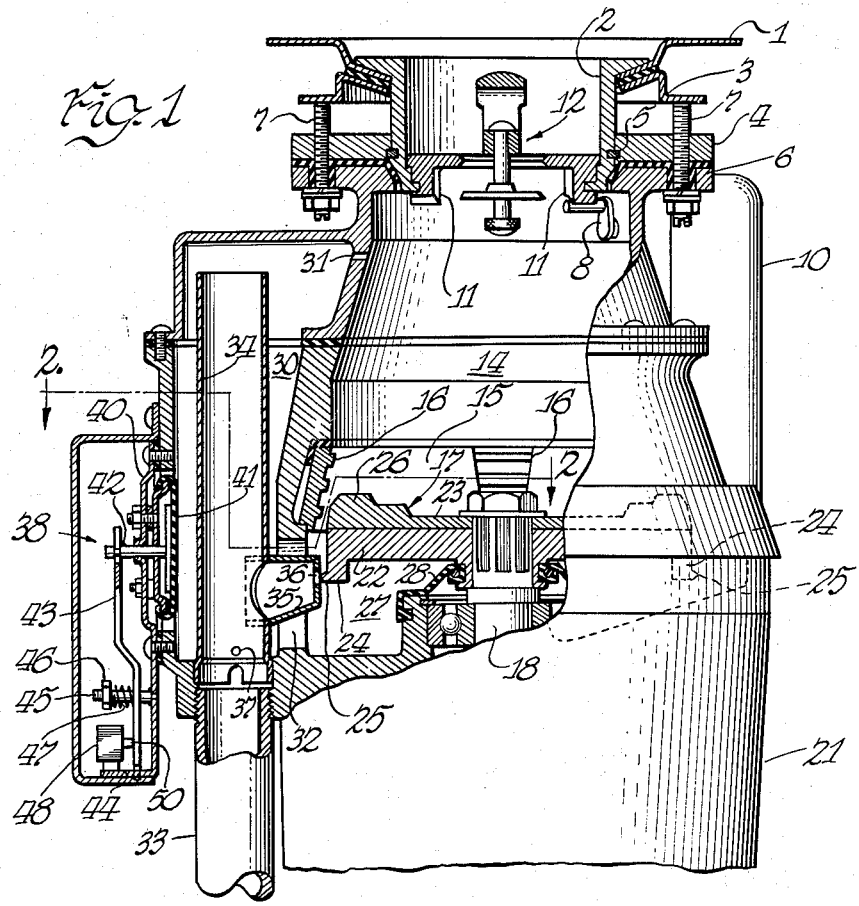
Inventor
Robert J. Sutton
by Andrew L. Hubbard
Atty.

United States Patent Office 2,742,236
Patented Apr. 17, 1956

2,742,236
CONTROL SYSTEM FOR WASTE DISPOSAL APPARATUS

Robert John Sutton, Chicago, Ill., assignor to General Electric Company, a corporation of New York Application April 29, 1953, Serial No. 351,774

11 Claims. (Cl. 241—36)

This invention relates to food waste disposal apparatus of the type in which food scraps and the like are comminuted in the presence of water and the resulting liquid mixture discharged through the drainage piping of a sink or other plumbing fixture in which the apparatus is installed.

Unless water is adequately supplied to a food waste disposer during its operation, the comminuted waste becomes a pasty mass which will harm the apparatus and clog the drainage system. It has therefore been the practice of manufacturers of disposers to recommend that the comminuter drive motor circuit be provided with a switch which is installed in the cold-water line serving the sink faucet, said switch being normally in open circuit condition and closing only as the result of a pre-determined rate of discharge of water into the sink, whence it flows into the comminution chamber. A switch and installation of this type is shown in Powers U. S. No. 2,244,402, granted on June 3, 1941 for "Waste Disposal Apparatus".

Although in disposer installations in new construction the water flow responsive switch adds only its cost to the total installation cost, the installation of a flow switch in older buildings becomes an appreciable factor because the plumber has to break and re-organize the existing cold-water line. This may also entail the additional expense of opening the building wall and restoring it after installation. As a result, an increasing number of installations are being made without the protection of water flow responsive switches. If the user of such a non-protected disposer disregards operating instructions and runs the disposer without water, or with an insufficient flow of water, faulty operation and eventual failure of the apparatus is inevitable.

It is therefore a main object of my invention to provide waste disposal apparatus with a self-contained switch mechanism which will not permit the apparatus to operate unless the comminuting chamber is adequately supplied with water.

It is another object of my invention to provide waste control apparatus having means for operating a motor control switch to closed circuit position only upon the imposition of a pre-determined head of liquid on the switch actuator.

It is a further object of the invention to provide, in a waste disposal apparatus, a discharge chamber communicating with the comminution chamber, and to locate in said discharge chamber a motor-control switch operable to closed-circuit position in response to a pre-determined height of liquid therein.

It is yet another object of the invention to provide in waste disposal apparatus having switch means disposed in a discharge chamber as above stated, means providing controlled drainage from said chamber, thus making it necessary to introduce liquid into said chamber faster than its drainage rate therefrom in order to maintain the motor-control switch in closed circuit status.

In a presently preferred embodiment of the invention I apply to a relatively conventional waste disposal apparatus a vertically extending drainage chamber communicating with the comminution chamber. Within said drainage chamber, and forming the principal out-flow means therefrom, is a vertical standpipe having an open top and a direct connection at its base with the sink drainage system. Near the base of the standpipe I provide supplemental drainage means comprising one or more flow passages having a total flow capacity which is at or about the lower limit of proper water supply to the disposer. It will be seen therefore that in order to fill the chamber to the standpipe-overflow level and to maintain said level, liquid must enter the discharge chamber faster than it can escape therefrom through the supplemental drain passages. At the base of the chamber and considerably below the standpipe overflow level, a chamber wall is fitted with a flexible diaphragm and a normally open switch which will operate to closed circuit position only when the diaphragm is flexed in response to a head of liquid which is substantially at the overflow spill level.

It will thus be seen that by installing such a switch as a control switch in the waste disposer drive motor circuit, the motor will operate only when there is a pre-determined quantity of liquid in the discharge chamber. It is also apparent that said quantity is dependent upon continual replenishment from the comminution chamber at a rate faster than the discharge chamber can drain through its supplemental drainage ports. When at the end of the grinding operation the user shuts off the water flow at the sink the motor will continue to operate until the head of liquid effective against the diaphragm drops below the switch actuating level. Surplus liquid in the chamber and in the waste disposer comminution chamber will thereafter drain into the sink drainage piping through the supplemental drainage ports.

Other features and advantages of the invention will be apparent from the following detailed description of a typical embodiment thereof, read in the light of the accompanying drawings in which:

Fig. 1 is a fragmentary side sectional elevation of waste disposal apparatus embodying the invention;

Fig. 2 is a plan section, looking in the direction of lines 2—2 of Fig. 1; and

Fig. 3 is a somewhat schematic wiring diagram.

The waste disposal apparatus shown in Fig. 1 is generally of the type described in Swisher Serial No. 229,215, filed on May 31, 1951, now Patent Number 2,669,395, granted February 16, 1954, for "Kitchen Waste Disposal Apparatus With Reversing Means" and assigned to my present assignee. As such, the apparatus is installed at the drainage opening of a kitchen sink 1 by means of a sink flange 2, a clamping ring 3, and a support flange 4 suitably carried on the collar portion on the sink flange as by the illustrated ring-like shoulder 5. Such an assembly provides means whereby the upper flange 6 of the disposal apparatus body may be securely suspended from the sink by the suitable plurality of bolts 7. A crank arm 8 in the upper portion of the waste disposal apparatus is arranged to operate a switch (indicated at 9 in Fig. 3) contained with other conventional motor-control devices in the external housing 10. The switch crank arm 8 may be operated between switch opening and closing positions by one or the other of the cam portions 11 depending from the combined stopper and switch control mechanism 12, as fully disclosed in the above-noted Swisher application. It should be understood that the use of a stopper-controlled switch device is optional with the present invention, although it is advantageous for several reasons, among them being the safety factor of not being able to operate the disposer unless the stopper is in proper position.

The apparatus comprises a comminution chamber 14 into which the pieces of food waste are placed. At the base of said chamber there is a ring 15 of hardened metal formed with a plurality of shredding and abrading elements 16 which may advantageously comprise bosses having horizontally extending grooves, as shown. Within said said chamber, and forming the base thereof, is a rotor 17 arranged to be rotated in a horizontal plane by means of a shaft 18 driven by a motor (indicated at 20 in Fig. 3) which is contained within a motor housing 21. The rotor is, in effect, a relatively heavy flywheel. It may be keyed or otherwise fixed to the shaft for rotation therewith. The rotor may comprise a base portion 22 having a wear-resisting shoe 23 as shown, or may comprise an integral casting, as well known to those skilled in the art. In any event, the lower portion has lugs 24, each provided with a pointed or sharp-edged tip 25 for a purpose later described, and the upper portion has heavy impellers or blade members 26. Two of such impellers are usually adequate and it will be understood that the lugs 24 may be substantially equal in width to the impellers and, like them, diametrically arranged.

During the comminution operation the rapidly rotating flywheel 17 throws the food waste violently about within the chamber and the waste is quickly reduced to small particle size by the tearing, cutting and abrading action of the elements 16 and other cutting devices (not shown). This is accomplished in the presence of water and the resulting liquid passes over the rim of the flywheel into an annular basin 27. Appropriate water-sealing means 28 are of course provided to prevent the passage of liquid into the motor housing.

A discharge chamber 30 may be formed integral with the upper and lower portions of the chamber 14 or may be applied thereto in any other suitable fashion. Said chamber 30 is relatively tall and communicates directly with chamber 14 only through the air vent opening 31. At its base the chamber 30 communicates with the basin 27 through the large area passage 32. The liquid mixture of comminuted food waste particles and water will therefore flow relatively freely from the basin 27 into the discharge chamber 30. The drain pipe 33 (it will be understood that said pipe either comprises part of a conventional sink trap or communicates directly therewith) is tapped into the bottom of the chamber 30. A standpipe 34, based in said chamber immediately above and advantageously in line with the drain pipe 33 prevents any large-volume direct flow of liquid from the chamber into said drain pipe. From a side wall of the standpipe a branch 35 projects through the passage 32 into basin 27. As best shown in Fig. 2 the end wall of said branch is rounded, and at a level in the path of the tip 25 said end wall has an opening 36. By reason of said rounded wall the opening 36 will be swept through by a tip 25 twice for each revolution of the flywheel 17. If desired the wall of the standpipe 34 may have other apertures 37 near its base. The total area of the apertures 36 and 37 should preferably provide gravity drainage at about one to one-and-one-half gallons per minute. This is less than the rate of flow desired for operation of the disposer. It will be seen therefore that the chamber 30 will fill to the standpipe overflow level only when liquid is flowing into the chamber at a faster rate than it is draining out of the chamber through the standpipe opening.

Near its base a sidewall of chamber 30 has an opening about which is fitted the pressure-responsive switch assembly 38 which is to respond initially to the static head of a column of liquid in said chamber, and later to the velocity head of liquid flowing into the chamber, or a combination of velocity head and static head. Said assembly includes a mounting plate 40 arranged to secure a flexible diaphragm 41 facing the interior of the chamber 30. An actuating rod 42 having a suitable head portion bearing against the diaphragm extends through a sleeve bearing in the plate 40, and at its outer end is grooved to loosely receive the forked end of a lever 43 pivotally supported in the base portion 44 of the plate 40. A stud 45 extends from said plate freely through an opening in lever 43; the end of said stud is threaded to receive an adjustment nut 46 by means of which a light coil spring 47 is tensioned to impose a suitable bias on the lever 43. Near the base of plate 40 there is suitably supported a normally open switch 48 of the well-known "Microswitch" type; the operating plunger 50 thereof is self-biased for continuous engagement with the lever 43. The head of water necessary to deflect diaphragm 41 to switch-closing position may be established by adjusting spring 47 to place more or less bias on lever 43.

Assuming that chamber 14 has received a quantity of food waste and the stopper 12 positioned to operate switch 9 to closed circuit position, the sink faucet (not shown) is opened and water flows into the chamber 14, passes into basin 27 and gradually begins to rise in chamber 30. Switch 48 will remain open and the motor 20 inoperative till the static head of liquid in the chamber deflects diaphragm 41 sufficiently to cause the lever 43 to close switch 48. As above stated, this will occur as the liquid reaches the upper portion of pipe 34. The motor becomes energized as switch 48 closes.

The motor-driven flywheel causes the food waste to be reduced to small particle size. The flywheel has a pumping action, particularly in view of the elements 24, and the accumulated liquid in the chamber 14 is quickly drawn into basin 27 and projected into chamber 30. Some of the liquid will pass through the opening 36 and the openings 37, and therefore, unless the user maintains a flow of water into the apparatus greater than will pass through said openings under operating condition, the water level in chamber 30 will recede until the pressure therein is insufficient to maintain the switch 48 in closed circuit condition. The motor will of course stop if this occurs. The tips 25 sweep the opening 36 clear of any food waste accumulation thus maintaining the opening always clear for the passage of a quantity of liquid.

When the user wishes to end the operation of the disposer, he may do so by turning off the water. Because no more water will be entering the chamber 30, the water remaining therein and in the basin 27 will drain by gravity into the pipe 33, and will eventually reach a level insufficient to hold switch 48 closed. It will be understood of course that the user may at any time stop the operation of the disposer by turning the stopper 12 to open the switch 9, which is in series with switch 48 in the motor circuit.

It has previously been mentioned that the rotor or flywheel 17 produces a pumping action which drives the liquid from basin 27 into the discharge chamber 30. Although the motor will not start until the required static head of liquid is reached in chamber 30, the maintenance of motor operation is dependent in large measure upon the velocity head of liquid impinging upon the diaphragm 41. The flow condition within the chamber, as observed through a transparent wall thereof in laboratory demonstrations, is characterized by turbulence, and it is improbable that the static head alone could hold the switch 48 in closed circiut position. The turbulence is, of course, desirable in that the comminuted waste is not permitted to settle out, and even bone particles and other heavier-than-water materials are carried into the mouth of the standpipe. It is probable that a portion of such heavy particles will flow directly into the drain 33 through the openings 36 and 37.

While there has been described what is at present considered to be the preferred embodiment of the invention, it will be understood that various modifications may be made therein, and it is intended to cover in the appended claims all such modifications as fall within the true spirit and scope of the invention.

I claim:

1. Waste disposal apparatus, comprising a chamber to receive waste material and water, means in said chamber to reduce said waste material to small particle size and to pass it from said chamber as a liquid mixture of comminuted material and water, an electric motor for driving said comminution means, a discharge chamber arranged to receive said mixture, drainage means communicating with said discharge chamber and including a standpipe having an inlet end disposed substantially above the level of entry of said liquid mixture into said discharge chamber, a normally open electric switch in said motor circuit, and pressure-responsive means including a flexible diaphragm disposed in a wall of said discharge chamber at the lower portion thereof for operating said switch to closed circuit status in response to a predetermined static head of liquid in said discharge chamber.

2. Waste disposal apparatus, comprising a chamber to receive waste material and water, a basin below said chamber, means in said chamber to reduce said waste material to small particle size and to pass it from said chamber into said basin as a liquid mixture of comminuted material and water, an electric motor for driving said comminution means, a discharge chamber having a passage directly communicating with said basin through which to receive said liquid mixture, drainage means communicating with said discharge chamber and including a standpipe having an inlet end disposed substantially above the level of entry of said liquid mixture into said discharge chamber, a normally open electric switch in said motor circuit, and pressure-responsive means for operating said switch to closed circuit status in response to a pre-determined static head of liquid mixture in said discharge chamber and maintaining said switch in said status in response to the velocity head of liquid mixture entering said discharge chamber, said switch-operating means including a flexible diaphragm disposed in said chamber in the line of entry of said liquid mixture into said chamber for deflection determined by the static head of liquid mixture in said chamber and the velocity head of said mixture entering said chamber, and means mechanically connecting said diaphragm with said switch to operate the same upon deflection of said diaphragm to a predetermined degree.

3. Waste disposal apparatus, comprising a comminution chamber to receive waste material and water, means including a rotor disposed at the bottom of said chamber to cause said material to be reduced to small particle form, a basin below said rotor into which material flows from said chamber as a liquid mixture of waste particles and water, an electric motor for driving said rotor, a discharge chamber disposed externally of said comminution chamber, a passage communicating between said basin and said discharge chamber, drainage piping communicating with said discharge chamber and including a standpipe having an inlet end disposed substantially above said passage, a normally open electric switch in said motor circuit, and pressure responsive means including a flexible diaphragm disposed in a wall of said discharge chamber at the level of said passage to operate said switch to closed circuit status in response to a predetermined static head of liquid in said discharge chamber.

4. Waste disposal apparatus as in claim 3, in which said rotor functions as a pump to accelerate flow of said liquid mixture through said passage into said discharge chamber.

5. Waste disposal apparatus as in claim 3, in which said rotor functions as a pump to accelerate flow of liquid mixture through said passage into said discharge chamber and said diaphragm is disposed in said discharge chamber to be subject to the velocity head of liquid flowing into said discharge chamber.

6. In combination with a sink or the like having a drainage opening and means for admitting a flow of water thereinto, waste disposal apparatus comprising a comminution chamber fixed to said sink and having an opening in direct communication with said sink drainage opening, means including a rotor disposed at the bottom of said chamber to cause said material to be reduced to small particle form, a basin below said rotor into which liquid flows from said chamber as a liquid mixture of waste particles and water, an electric motor for driving said rotor, a discharge chamber disposed externally of said comminution chamber, a passage communicating between said basin and said discharge chamber, drainage piping communicating with said discharge chamber and including a standpipe having an inlet end within said chamber substantially above said passage, said drainage piping including flow passages disposed in the lower portion of said standpipe to provide other drainage means from said discharge chamber into said drainage piping, a normally open electric switch in said motor circuit, pressure responsive means including a flexible diaphragm disposed in a wall of said discharge chamber at the lower portion thereof to operate said switch to closed circuit status in response to static head of liquid in said discharge chamber, and means opposing deflection of said diaphragm to delay switch-operating actuation thereof until liquid level in said chamber is substantially above the level of said other drainage means.

7. Waste disposal apparatus, comprising a comminution chamber to receive waste material and water, means in said chamber to reduce said waste material to small particle size and to pass it from said chamber as a liquid mixture of comminuted material and water, an electric motor for driving said comminution means, a basin below said chamber to receive said liquid mixture therefrom, an upwardly extending discharge chamber disposed externally of said basin and said comminution chamber and communicating with said basin through a relatively large passage at the base of said discharge chamber, drainage means communicating with said discharge chamber and including a standpipe having an inlet end located within said chamber near the upper portion thereof, means including a branch extending from the lower portion of said standpipe into said basin and having an inlet opening to permit direct flow of liquid from said basin into said standpipe, a normally open electric switch for controlling flow of electric energy to said motor, a flexible wall supported relative to said discharge chamber at the lower portion thereof, and having a surface in direct communication with said chamber whereby said wall will be deflected in relation to the static head of liquid in said chamber above said wall, mechanical linkage between said flexible wall and said switch to operate the switch to closed circuit position upon deflection of said wall, and means for establishing a predetermined resistance to movement of said mechanical linkage to establish the static head necessary to operate said switch to said closed circuit position.

8. Waste disposal apparatus as in claim 7, in which said comminution means includes a rotor disposed between said comminution chamber and said basin.

9. Waste disposal apparatus as in claim 7, in which said comminution means includes a rotor disposed at the upper portion of said basin and the inlet opening of said standpipe branch faces the side wall of said rotor.

10. Waste disposal apparatus as in claim 7, in which said comminution means includes a rotor disposed at the base of said comminution chamber and having members extending from the rim of said rotor into said basin, said members being arranged to sweep the inlet opening of said standpipe branch during each rotation of said rotor to maintain said opening in condition for the flow of liquid thereinto.

11. Waste disposal apparatus as in claim 7, in which said comminution means includes a horizontally disposed rotor forming the base of said comminution chamber and having means extending from the rim of said rotor to sweep through the inlet opening of said standpipe branch during each rotation of said rotor to prevent accumulations of waste material within said opening.

References Cited in the file of this patent

UNITED STATES PATENTS

| | | |
|---|---|---|
| 2,469,205 | Powers | May 3, 1949 |
| 2,591,388 | Trotter | Apr. 1, 1952 |
| 2,664,247 | Jordan | Dec. 29, 1953 |
| 2,667,308 | Hammes | Jan. 26, 1954 |